May 21, 1968     J. B. BENEDETTI ET AL     3,384,273

MEASURING DISPENSER WITH OSCILLATING TRAP CHAMBER

Filed Jan. 26, 1967

INVENTORS
JOHN B. BENEDETTI
STANLEY GRYMES
BY Joseph F. Cole
ATTORNEY though only the preferred embodiment of our invention, it should be understood that various changes, or modifications, may be made within the scope of the annexed claims without departing from the spirit thereof.

United States Patent Office 3,384,273
Patented May 21, 1968

3,384,273
MEASURING DISPENSER WITH OSCILLATING TRAP CHAMBER
John B. Benedetti, 929 Azelea Ave., and Stanley Grymes, 832 Linden Ave., both of Burlingame, Calif. 94010
Filed Jan. 26, 1967, Ser. No. 611,989
2 Claims. (Cl. 222—332)

ABSTRACT OF THE DISCLOSURE

A measuring dispenser securable to the pouring neck of a container and having a spindle projecting from the cap, with a metering chamber housing rotatably mounted on the spindle, and this housing having a valve plate movable into a chamber-filling position, when the housing is turned in one direction, and the valve plate being movable into a chamber-emptying position, when the housing is turned in the opposite direction.

Background of the invention (1) *Field of the invention.*—The present invention relates to improvements in measuring dispensers, and it consists of the combinations, constructions and arrangement of parts, as hereinafter described and claimed.

(2) *Description of the prior art.*—Measuring dispensers have been provided in the art, and this invention pertains to specific improvements and embodiment.

Summary

It is proposed in this invention to provide a cap that is securable to the pouring neck of a container so that contents of the latter may be dispensed in predetermined measured amounts. More specifically stated, the cap has a spindle on which a metering chamber is rotatably mounted, the spindle being provided with an inlet port for filling the metering chamber when a valve plate carried by the housing is moved into one position, and the spindle further having an outlet port through which the contents of the metering chamber may be discharged when the valve plate is moved into another position, the spindle being provided with a discharge spout through which the contents may be poured.

It is further proposed in this invention to provide a measuring dispenser in which the cap, spindle and discharge spout are formed as an integral first component, and the rotatable housing and valve plate being formed as an integral second part.

Brief description of the drawing

For a better understanding of the invention, reference should be had to the accompanying drawing, forming part of this specification, in which.

Figure 1:
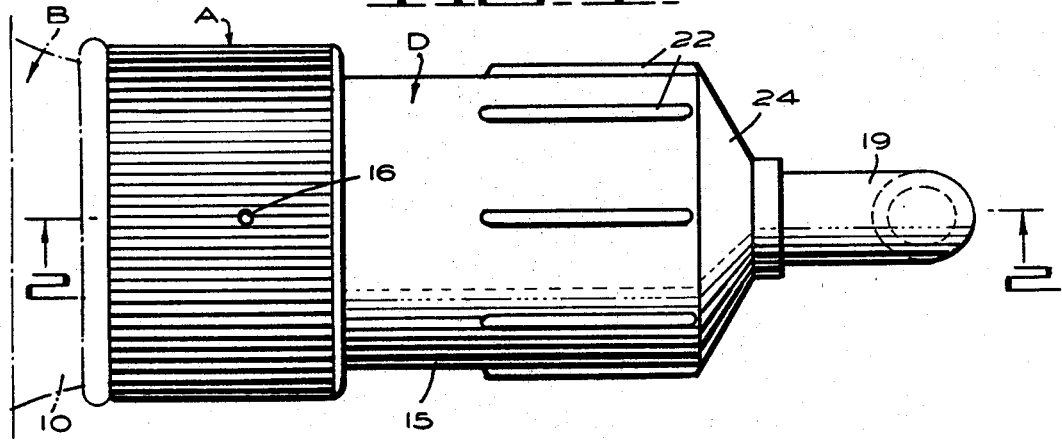
FIG. 1 is a top plan view of our measuring dispenser.

While we have shown only the preferred embodiment of our invention, it should be understood that various changes, or modifications, may be made within the scope of the annexed claims without departing from the spirit thereof.

Description of the preferred embodiment

Referring now to the drawing in detail, we have shown a cap A which is mountable on the pouring neck 10 of a container B by any suitable means, for instance threads 11 (see FIG. 2), and this cap is provided with an outlet opening 12 through which contents of the container may be poured. Although our measuring dispenser is intended primarily for delivering predetermined quantities of liquid, is may be used for delivering powdered or granulated materials.

It will be noted that a spindle C is secured to the cap A in coaxial relation therewith and projecting forwardly therefrom, this spindle having a cylindrical outer surface 13 concentric with the axis 14 of the spindle. Moreover, a rotatable housing D surrounds the spindle C in coaxial relation therewith and having a main body shell 15 spaced outwardly therefrom to define a metering chamber E of a predetermined capacity and this chamber is vented to the atmosphere by a bleed hole 16 formed in the cap A. The purpose of venting the metering chamber is to perit air to enter the container A when contents are being poured from the latter and further to permit air to enter the metering chamber E when contents are being discharged from the latter.

Figure 2:
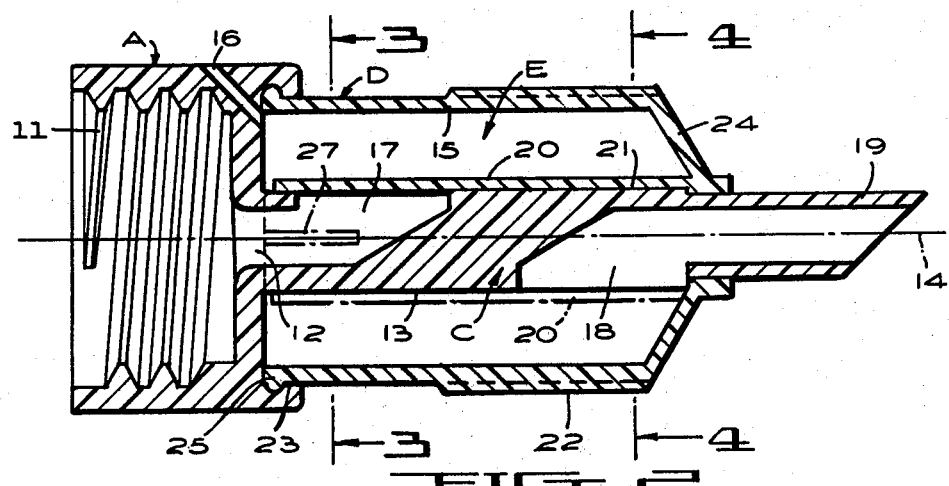
FIG. 2 is a longitudinal sectional view taken along the plane 2—2 of FIG. 1.
Figure 3:
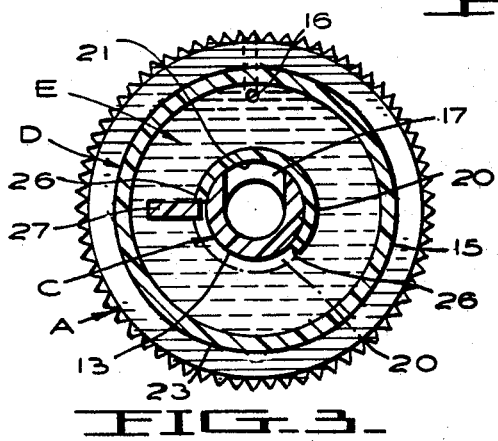
FIGS. 3 and 4 are transverse sectional views taken along the planes 3—3 and 4—4, respectively, of FIG. 2.
Figure 4:
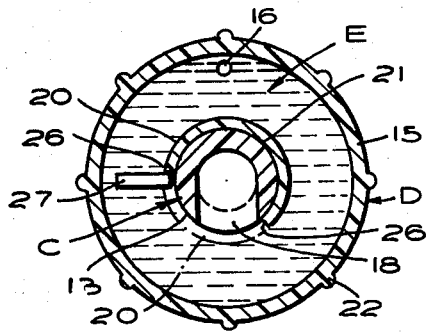

As disclosed in FIGS. 2 and 3, the spindle C is formed with an inlet port 17 in a rear portion thereof placing the outlet opening 12 of the cap A in communication with the metering chamber E, when this inlet port is uncovered, whereby contents from the container B may flow into the metering chamber to fill the latter. Also FIGS. 2 and 4 illustrate an outlet port 18 formed in a forward portion of the spindle C placing the metering chamber E in communication with a discharge spout 19, when this outlet port is uncovered, whereby contents from the metering chamber may flow through the discharge spout. The discharge spout 19 is formed at the forward end of the spindle C in axial alignment therewith. The inlet and outlet ports 17 and 18, respectively, are spaced circumferentially of the spindle relative to one another, and have been shown as being located on opposite sides of the spindle (see FIGS. 3 and 4).

For the purpose of controlling the dispensing of the contents of the container B, a rotatable arcuate valve plate 20 has been provided, this valve plate having a concave inner surface 21 bearing against the cylindrical outer surface 13 of the spindle C, this valve plate extending longitudinally of the spindle so as to include the regions in which the ports 17 and 18 are formed (see FIG. 2).

The valve plate 20 is rotatable into a chamber-filling position, as shown by dot-dash lines in FIGS. 2, 3 and 4, with the inlet port 17 being uncovered and the outlet port 18 covered at this time. Also, the valve plate 20 is further rotatable into a chamber-emptying position, with the inlet port 17 being covered and the outlet port 18 uncovered at this time, as shown in full lines in FIGS. 2, 3 and 4.

This valve plate 20 is fixed to the housing D, whereby rotation of the latter will impart a corresponding rotation to the valve plate. In order to facilitate turning the housing D manually in either direction, ribs 22 have been provided on the exterior surface of the main body shell 15.

As shown in FIG. 2, the cap A is formed with a coaxial recess 23 in its forward face. The housing D is cup-shaped, defining a wall 24 at its forward end that is rotatably supported on the spindle C, and the main body shell 15 has a marginal rim 25 at its rear end which extends into the recess 23 with a liquid-tight seal therebetween and the cap A supporting the rear end of the housing D for rotation.

The valve plate 20 defines longitudinal opposite lateral edges 26 that are spaced circumferentially from one another, as illustrated in FIGS. 3 and 4. Moreover, a stop 27 is carried by the cap A and extends into the space between the edges 26 so as to limit rotation of the valve plate 20 between chamber-filling and chamber-emptying positions.

It will be observed from FIG. 2 that the cap A, spindle C and discharge spout 19 are formed as an integral first component, and that the rotatable housing D and valve plate 20 are formed as an integral second component. Of course, the measuring dispenser may be made from any suitable material, such as plastic or metal, and we do not wish to be limited in this respect.

We claim:
1. In a measuring dispenser:
  (a) cap mountable on the pouring neck of a container and being provided with an outlet opening through which contents of the container may be poured;
  (b) a spindle secured to the cap in coaxial relation therewith and projecting forwardly therefrom, this spindle having a cylindrical outer surface;
  (c) a rotatable housing surrounding the spindle in coaxial relation therewith and having a main body shell spaced outwardly therefrom to define a metering chamber of a predetermined capacity and this chamber being vented to the atmosphere;
  (d) the spindle being formed with an inlet port in a rear portion thereof placing the outlet opening of the cap in communication with the metering chamber, when this inlet port is uncovered, whereby contents from the container may flow into the metering chamber to fill the latter;
  (e) the spindle having a discharge spout at its forward end, and the spindle being provided with an outlet port in the forward portion thereof placing the metering chamber in communication with the discharge spout, when this outlet port is uncovered, whereby contents from the metering chamber may flow through the discharge spout;
  (f) the inlet and outlet ports being spaced circumferentially of the spindle relative to one another;
  (g) a rotatable arcuate valve plate having a concave inner surface bearing against the cylindrical outer surface of the spindle, this valve plate extending longitudinally of the spindle so as to include the regions in which the ports are formed;
  (h) the valve plate being rotatable into a chamber-filling position, with the inlet port being uncovered and the outlet port covered at this time;
  (i) the valve plate further being rotatable into a chamber-emptying position, with the inlet port being covered and the outlet port uncovered at this time;
  (j) and the valve plate being fixed to the housing, whereby rotation of the latter will impart a corresponding rotation to the valve plate;
  (k) the cap being formed with a coaxial recess in its forward face;
  (l) the housing being cup-shaped, defining a wall at its forward end that is rotatably supported on the spindle, and the main body shell of the housing having a marginal rim at its rear end which extends into the recess of the cap with a liquid-tight seal therebetween and the cap supporting the rear end of the housing for rotation.

2. In a measuring dispenser:
  (a) a cap mountable on the pouring neck of a container and being provided with an outlet opening through which contents of the container may be poured;
  (b) a spindle secured to the cap in coaxial relation therewith and projecting forwardly therefrom, this spindle having a cylindrical outer surface;
  (c) a rotatable housing surrounding the spindle in coaxial relation therewith and having a main body shell spaced outwardly therefrom to define a metering chamber of a predetermined capacity and this chamber being vented to the atmosphere;
  (d) the spindle being formed with an inlet port in a rear portion thereof placing the outlet opening of the cap in communication with the metering chamber, when this inlet port is uncovered, whereby contents from the container may flow into the metering chamber to fill the latter;
  (e) the spindle having a discharge spout at its forward end, and the spindle being provided with an outlet port in the forward portion thereof placing the metering chamber in communication with the discharge spout, when this outlet port is uncovered, whereby contents from the metering chamber may flow through the discharge spout;
  (f) the inlet and outlet ports being spaced circumferentially of the spindle relative to one another;
  (g) a rotatable arcuate valve plate having a concave inner surface bearing against the cylindrical outer surface of the spindle, this valve plate extending longitudinally of the spindle so as to include the regions in which the ports are formed;
  (h) the valve plate being rotatable into a chamber-filling position, with the inlet port being uncovered and the outlet port covered at this time;
  (i) the valve plate further being rotatable into a chamber-emptying position, with the inlet port being covered and the outlet port uncovered at this time;
  (j) and the valve plate being fixed to the housing, whereby rotation of the latter will impart a corresponding rotation to the valve plate;
  (k) the valve plate defining longitudinal opposite lateral edges that are spaced circumferentially from one another;
  (l) and a stop carried by the cap and extending into the space between the opposite lateral edges of the valve plate so as to limit rotation of the latter between chamber-filling and chamber-emptying positions.

References Cited

FOREIGN PATENTS 201,766   8/1923   Great Britain.
232,121   4/1925   Great Britain.

SAMUEL F. COLEMAN, *Primary Examiner.*